Figure 1:
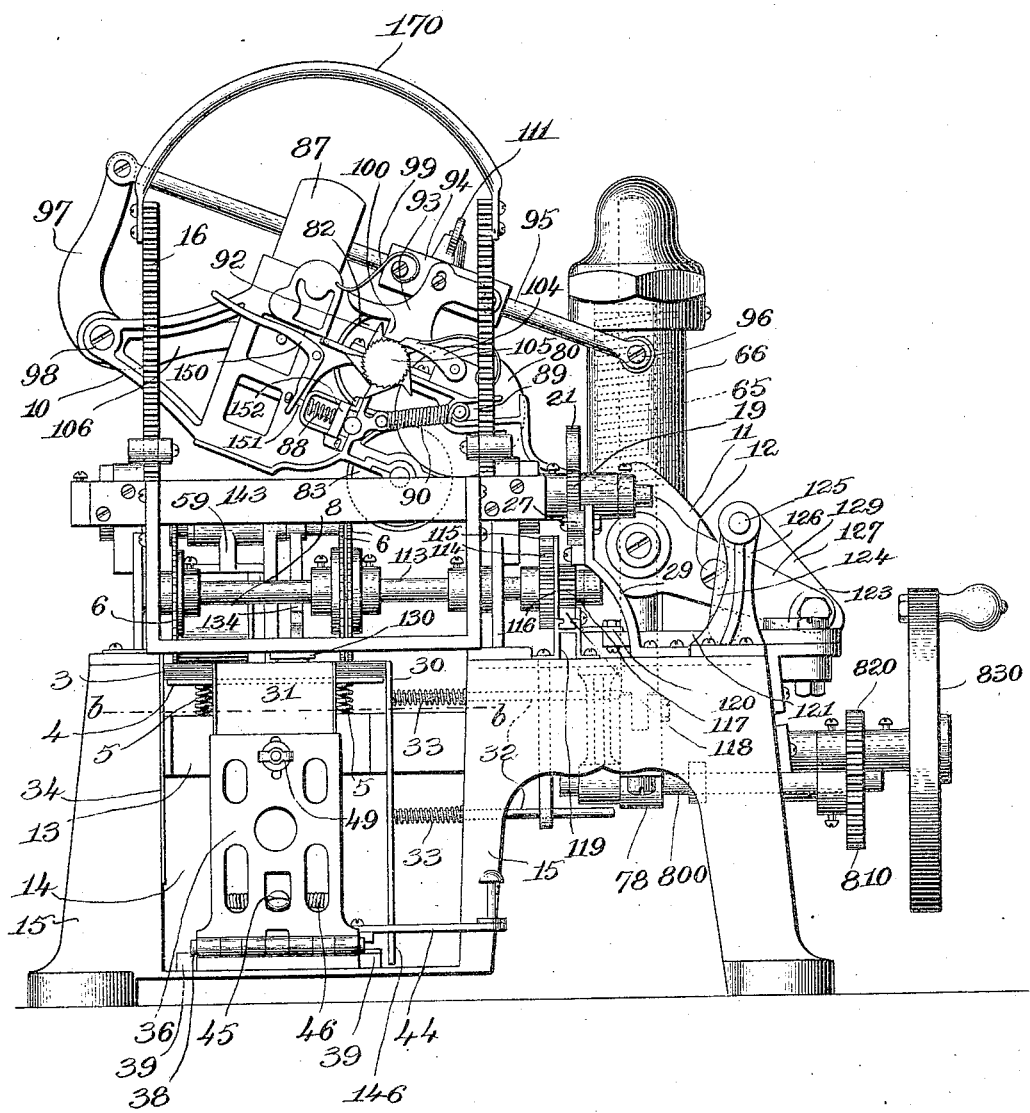

J. F. MONAGHAN.
STAMP AFFIXING MACHINE.
APPLICATION FILED NOV. 8, 1907.

942,454.

Patented Dec. 7, 1909.
5 SHEETS—SHEET 1.

Witnesses.
Thomas F. Drummond.
Joseph M. Ward.

Inventor.
John F. Monaghan.
By Crosby Gregory
Attys.

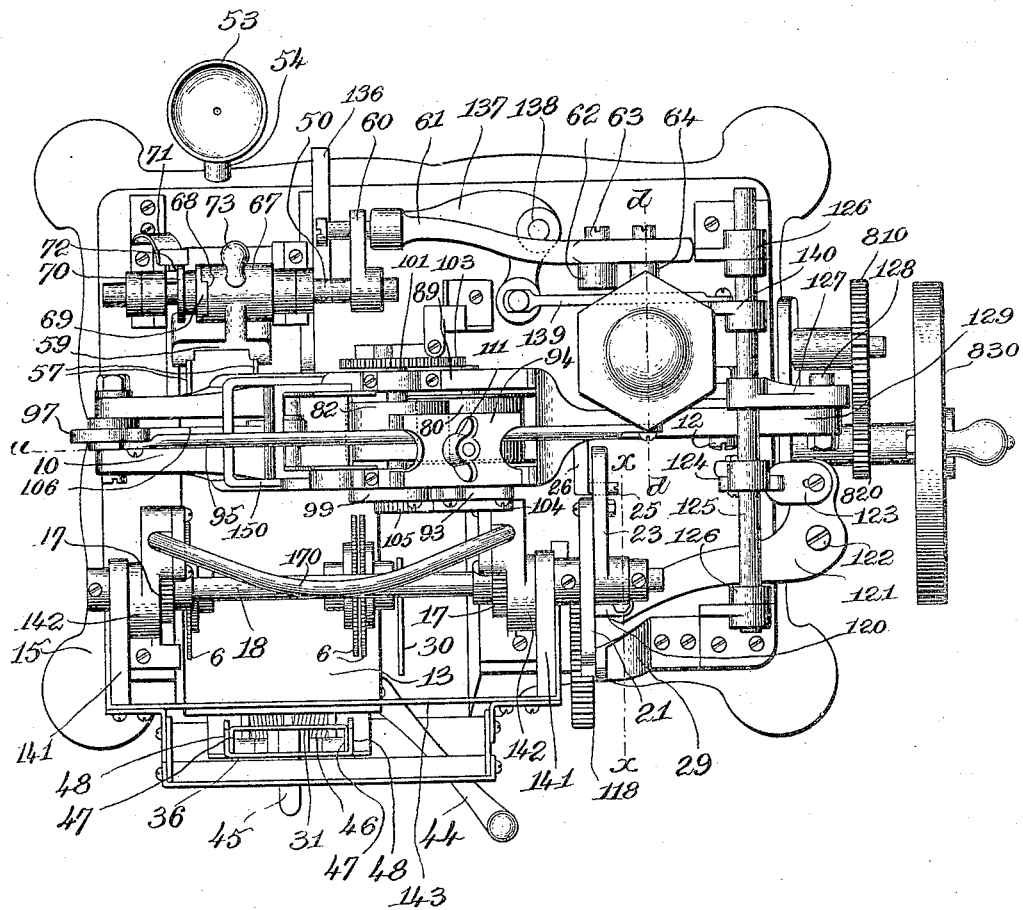

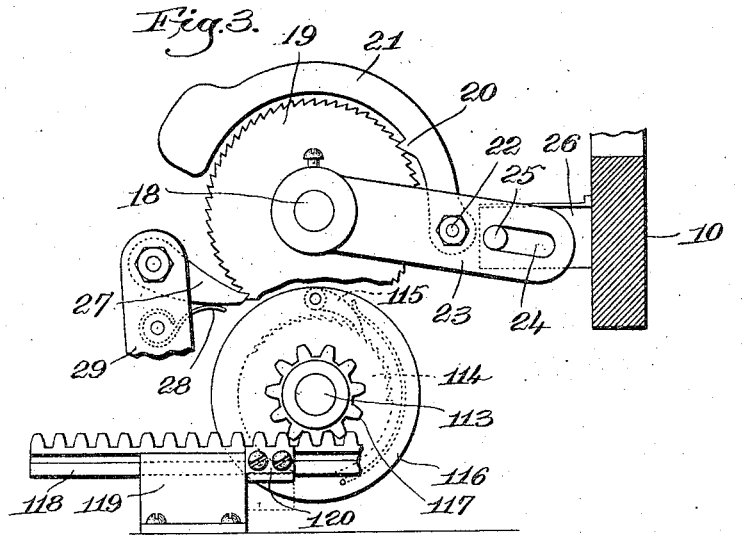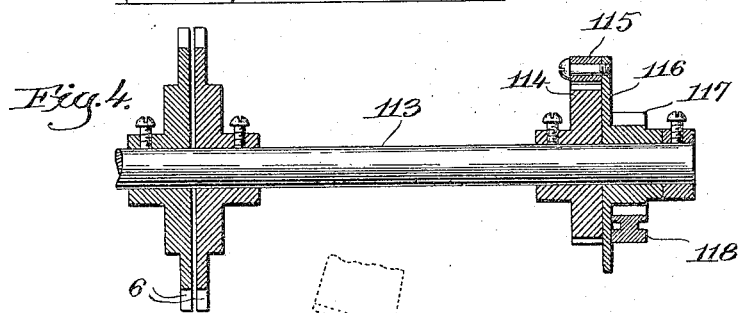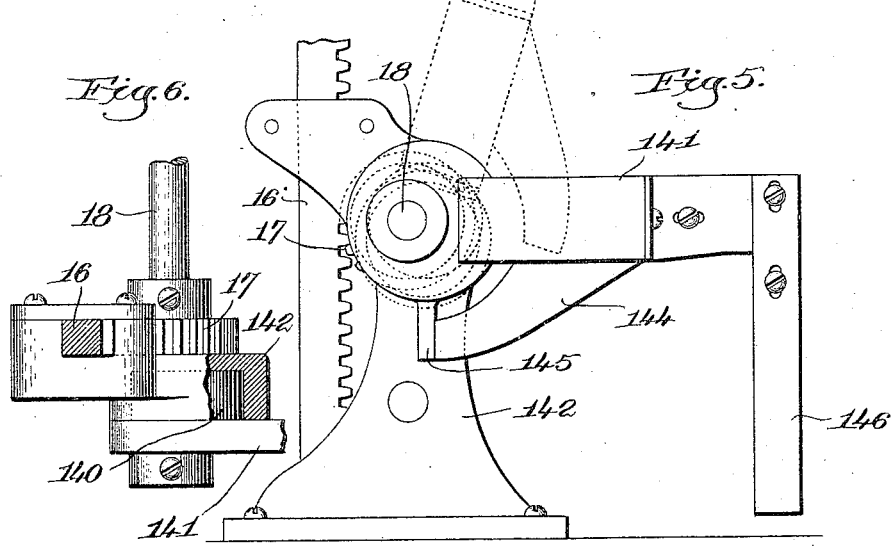

J. F. MONAGHAN.
STAMP AFFIXING MACHINE.
APPLICATION FILED NOV. 8, 1907.
942,454.
Patented Dec. 7, 1909.
5 SHEETS—SHEET 4.
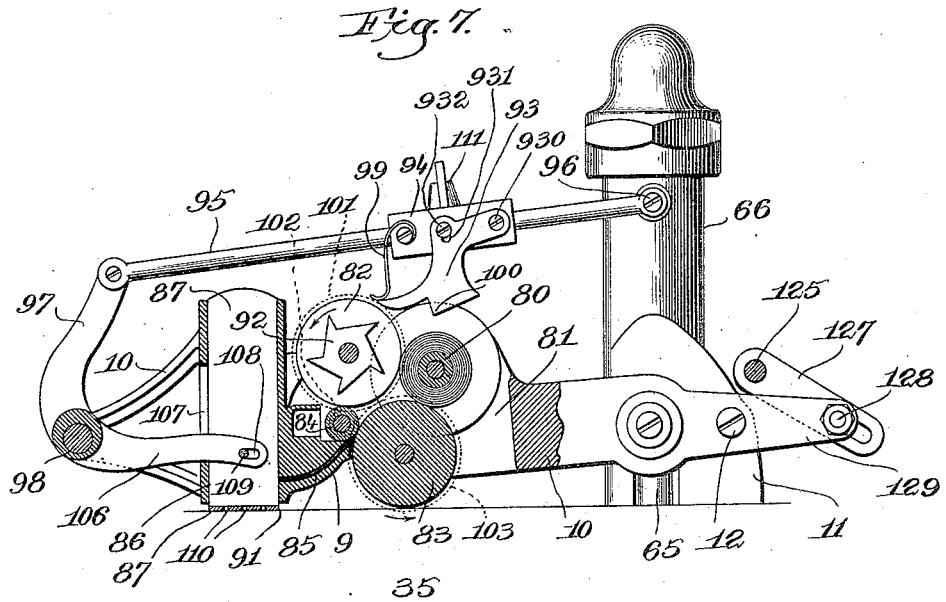
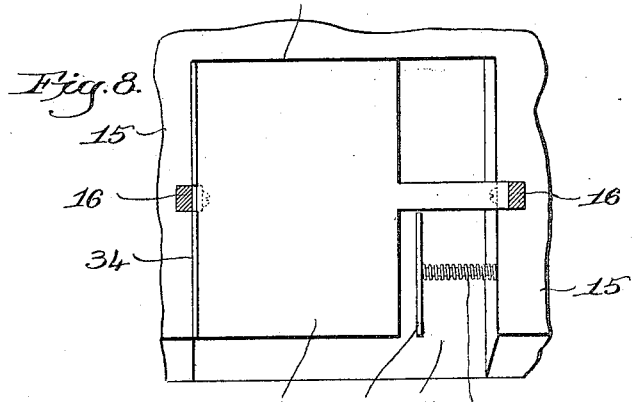
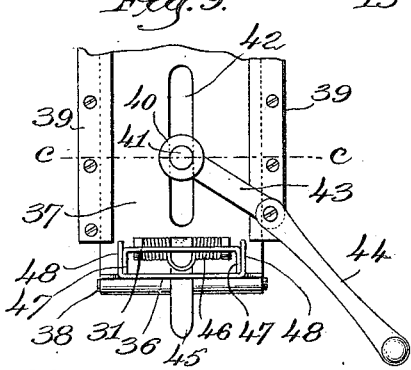
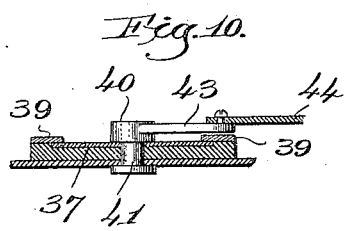
Witnesses.
Thomas J. Drummond
Joseph M. Ward
Inventor.
John F. Monaghan,
by Crosby Gregory
attys.

J. F. MONAGHAN.
STAMP AFFIXING MACHINE.
APPLICATION FILED NOV. 8, 1907.
942,454.
Patented Dec. 7, 1909.
5 SHEETS—SHEET 5.
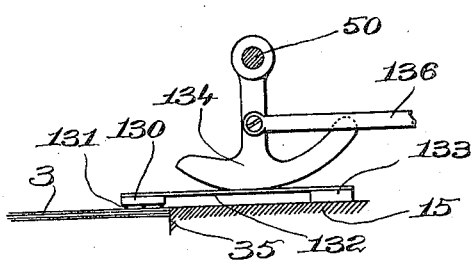
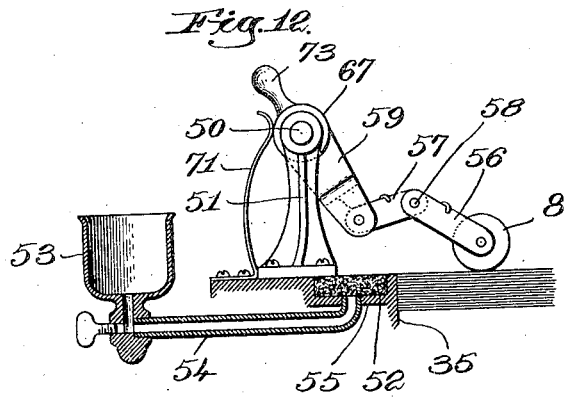
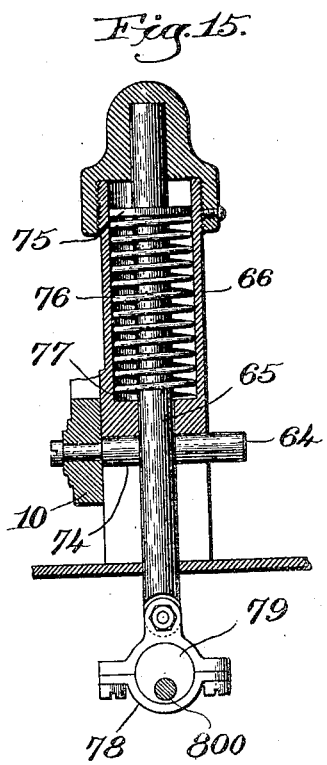
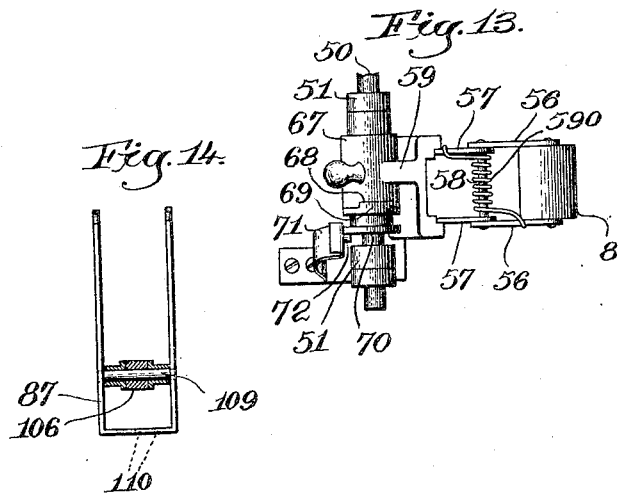
Witnesses.
Thomas J. Drummond
Joseph M. Ward
Inventor.
John F. Monaghan,
By Crosby Gregory
Attys.

UNITED STATES PATENT OFFICE.

JOHN F. MONAGHAN, OF SOUTH BEND, INDIANA.

STAMP-AFFIXING MACHINE.

942,454.  Specification of Letters Patent.  Patented Dec. 7, 1909.

Application filed November 8, 1907. Serial No. 401,237.

*To all whom it may concern:*

Be it known that I, JOHN F. MONAGHAN, a citizen of the United States, and a resident of South Bend, St. Joseph county, and State of Indiana, have invented an Improvement in Stamp-Affixing Machines, of which the following description, in connection with the accompanying drawing, is a specification, like characters on the drawing representing like parts.

This invention relates to machines that are adapted to apply gummed labels or stamps to papers or envelops, though the particular embodiment herein illustrated has been designed for applying stamps to envelops.

The machine is so arranged that the envelop to be stamped is first moistened at the point where the stamp is to be applied, and thereafter the stamp is affixed to the envelop by pressure sufficient to cause it to adhere. The envelops are preferably arranged in a stack on a yieldingly-mounted table so arranged that the top envelop is properly positioned to have the stamp applied thereto. While the envelops are so supported an envelop-moistening device operates to moisten the corner of the envelop where the stamp is to be applied, and thereafter a stamp-affixing mechanism comes into operation to apply the stamp to the moistened envelop. After the stamp has been so applied the stamped envelop is ejected from the machine by an envelop ejector and the operations are repeated. The magazine or other arrangement for holding the stack of envelops is adjustable so that it will accommodate envelops of different sizes, and means are provided to feed the yieldingly-supported table upwardly as the envelops are ejected so as to maintain the top envelop yieldingly in proper position to have the stamp applied thereto.

In the preferred embodiment of my invention the stamps are carried in the machine in the form of a ribbon, and the stamp-affixing mechanism is arranged so that at each cycle of operations one stamp is fed into position to be affixed to the envelop and said stamp is then sheared from the ribbon and applied to the moistened envelop.

While my invention is especially adapted for applying stamps to envelops it will be obvious that with appropriate changes it might be equally well used for applying gummed slips or labels to envelops or other papers, and I wish it understood that the invention is not necessarily limited to placing stamps on envelops.

In order to illustrate the principle of the invention I have selected for detailed description one embodiment thereof which is shown in details in the drawings, but I wish it understood that this embodiment is merely a selected one and is thus described in detail solely for the purpose of clearly setting forth the principle of the invention which is embodied in the claims at the end of the specification.

Referring now to the drawings Figure 1 is a side view of a machine embodying my invention; Fig. 2 is a top plan view of said machine; Fig. 3 is a section on substantially the line $x$—$x$, Fig. 2; Fig. 4 is a detail of the feeding means for the envelop ejector; Fig. 5 is a side view of the means for feeding the envelop-supporting table upwardly; Fig. 6 is a detail in plan of a part of Fig. 5; Fig. 7 is a section through the stamp-affixing mechanism on the line $a$—$a$, Fig. 2, said figure showing the mechanism in position for affixing a stamp to an envelop; Fig. 8 is a section on the line $b$—$b$, Fig. 1; Fig. 9 is a detail view of the magazine for supporting the envelops; Fig. 10 is a section on the line $c$—$c$, Fig. 9; Fig. 11 is a detail showing the means for holding the stack of envelops as the stamped envelop is ejected from the machine; Fig. 12 is a side view of the envelop-moistening device; Fig. 13 is a plan view of Fig. 12. Fig. 14 is a section through the stamp-affixing plunger; Fig. 15 is a section on line $d$—$d$, Fig. 2, through the plunger for operating the arm 10.

The stack of envelops which are to be stamped are illustrated at 3 and they are supported on a table 4 which is yieldingly sustained by a plurality of springs 5, said springs operating to yieldingly hold the top envelop against the envelop ejectors 6. The envelops are moistened by an envelop moistener 8 which will be more fully hereinafter described. And after they are moistened the stamps are applied by a stamp-affixing mechanism designated generally by 9, and which will also be more fully hereinafter described, it being sufficient at this time to say that said stamp-affixing mechanism is sustained by an arm 10 which is pivoted at 12 to a standard 11, and which is vibrated about said standard to move it toward and from the envelops.

*Envelop receiving magazine.*—I will first describe the magazine arrangement for sustaining the stack 3 of envelops. As stated above the stack 3 of envelops is sustained on the table 4, which, in turn, is yieldingly sustained by the springs 5. These springs are carried on a frame 13 which is received in a recess 14 formed in the main frame 15, said frame 13 having secured thereto the lower ends of rack bars 16 which extend upwardly through the machine and which are preferably connected by a handle 170. These rack bars are arranged to be elevated gradually as the stamped envelops are ejected from the machine thereby to maintain the top envelop of the stack always in position to have the stamp affixed thereto. For thus elevating gradually the frame 13 I have in the present embodiment provided two pinions 17 which are adapted to engage with the rack 16 and which are fast on a shaft 18. This shaft is rotated slowly at a speed sufficient to elevate the table 13 as the envelops are ejected from the machine, and I preferably secure the desired rotation of the shaft 18 by connecting it with the beam or arm 10 so that at each vibration of said arm 10 the shaft 18 will be turned slightly. For this purpose I have mounted on said shaft 18 a ratchet wheel 19 (see Fig. 3) with which coöperates a pawl 20 carried by a weighted member 21 that is hinged at 22 to an arm or pawl carrier 23. This pawl carrier is loosely mounted on the shaft 18, and at its free end it has a slot 24 in which is received a pin 25 carried by an arm 26 rigidly secured to and extending from the beam or arm 10. With this construction it will be seen that at each upward movement of the arm 10 the ratchet wheel 19 and the shaft 18 are advanced each one step, and at each downward movement the pawl 20 will click over the ratchet 19 and thus be carried into position to again advance said ratchet. The arm 21 overhangs the ratchet wheel and is of such shape that the weight thereof keeps the pawl 20 in engagement with the teeth of said ratchet. For preventing backward movement of the shaft 18 I have shown a stop pawl 27 which engages the ratchet wheel and is acted on by a suitable spring 28, said stop pawl being supported by a standard 29 rising from the frame 15.

The envelops of the stack 3 are held in their proper position on the table by means of a side plate 30 and an end plate 31. The side plate is received within the recess 14 and has projecting therefrom guide pins 32 which play in guiding apertures in the frame 15, and said side plate is yieldingly held against the envelops of the stack 3 by springs 33 which surround the guide pins 32 and are confined between the side plate and the frame 15. Since this side plate is thus yieldingly held in position it can be moved back to accommodate wider envelops than those illustrated in the drawings, as will be obvious, and the springs 33 will always maintain said side plate against the side of the stack and thus hold the envelops of the stack in proper position. The opposite edges of the envelops rest against the fixed side plate 34 which is formed at one side of the recess 14, as seen in Fig. 1. One end of each envelop of the stack rests against the fixed wall 35 of the recess 14, and the other end of each envelop engages the end plate 31. The end plate 31 is also preferably adjustably mounted so that it can be adjusted toward and from the fixed wall 35 to accommodate envelops of different lengths. In the present embodiment of my invention said end plate 31 is carried by a holder 36 which is pivoted at 38 to a slide 37. The slide 37 is mounted to slide back and forth in ways 39 formed in the bottom of the recess 14 (see Figs. 1, 9 and 10), and said slide is held in its adjusted position by means of a clamping nut 40 screw-threaded to the upper end of a clamping stud 41 which extends through the slot 42 in the slide. This clamping nut 40 may be operated in any suitable way but for convenience in operating it, I have shown it as having an arm 43 extending therefrom to which is pivoted a handle 44 extending out beyond the frame into convenient position to be manipulated by the operator. With this construction the clamping nut 40 can be tightened or loosened without the necessity of reaching in behind the holder 36. By loosening the clamping nut 40, the slide 37 may be adjusted so as to position the end plate 31 correctly to receive envelops of any desired length. The object in pivoting the holder 36 to the slide is to provide for swinging said holder and end plate down out of the way when a new package or lot of envelops is to be placed in the magazine. The holder is maintained in its vertical operative position by means of a catch 45 which is pivoted to the slide and which is acted on by a spring 46 that tends to hold it in locking engagement with the holder.

The end plate 31 is shown as having a flange 47 at each side (see Fig. 9), and said flanges are received between guide flanges 48 formed on the sides of the holder 36. Said end plate 31 can be adjusted vertically on the holder and is held in its adjusted position by any suitable means such as a clamping nut 49.

From the above it will be seen that the envelops are received between the fixed walls 34, 35, and the adjustable walls 30, 31, and are held by said walls in proper position while the stamps are being affixed and while the stack of envelops are being fed upwardly as the stamped envelops are ejected from the machine.

*Envelop-moistening device.*—For many reasons, I prefer to moisten the envelop rather than to moisten the stamp, although this is not essential to my invention, and in the present embodiment I have provided a device which automatically moistens each envelop just before the stamp-affixing mechanism operates to affix the stamp thereto. The envelop-moistening device is shown in Figs. 2, 12 and 13, and it comprises a moistener 8 of sponge or other absorbent material which is adapted to wipe over the corner of the envelop at an appropriate time, and means to maintain the moistener in a sufficiently moist condition to effect the desired result. The moistener 8 is shown as operatively connected to a rock shaft 50 which is mounted on a stand 51 carried by the frame, the connection between the moistener and the rock shaft being such that the oscillation of the rock shaft causes the moistener to wipe over the corner of the envelop and then to be carried into contact with a moistening pad 52 which may be of felt, sponge or any other absorbent material, and which is kept moist by water in a tank or receiver 53. This tank or receiver is connected by means of a pipe 54 with the pan 55 in which the moistening pad 52 is received, and therefore the pad 52 is always maintained in a saturated condition. Whenever the moistener 8 is retracted into contact with the pad 52, said moistener absorbs moisture which it carries over and deposits on the envelop when it is vibrated forward. In order to properly moisten the envelop without requiring the moistener to dwell on the envelop, I propose to provide for pressing the moistener against the envelop as it is wiped thereover. In the present embodiment the moistener is sustained between two arms 56 which are pivoted to two other arms 57 by means of a hinge pin 58. A spring 590 surrounds the said hinge pin, and one end of said spring engages one of the arms 57 and the other end engages one of the other arms 56, said spring being so arranged that it bears downwardly on the arms 56 thus applying more or less pressure to the moistener 8. The arms 57 are pivoted to an arm 59 which is mounted on the shaft 50, so that as said shaft oscillates the moistener 8 is moved back and forth between the top envelop and the moistening pad 52. The shaft 50 may be operated in any suitable way, and as constituting one convenient way for operating it I have shown it as having fast thereto an arm 60 to which is connected one end of a lever 61 that is pivoted to a fixed stand or support 62 by means of a suitable pivotal pin 63 (see Fig. 2). The end of the lever 61 has pivotal engagement with a stud 64 that extends from a spring-pressed plunger 65 that is adapted to move vertically within a casing 66. The vertical movement of the plunger 65 will obviously rock the lever 61 about its pivot 63 and thereby rock the shaft 50, the rocking movement of said shaft 50 giving the moistener its desired movement as plainly described above. The plunger 65 is also employed to give the beam 10 carrying the stamp-affixing mechanism its movement, and therefore since the stamp-affixing mechanism and the moistening device receive their motion from the same element they must of necessity work in harmony with each other. The means for operating the plunger will be described in detail when describing the stamp-affixing mechanism.

It is sometimes desirable to operate the moistener for moistening an envelop when the other parts of the mechanism are idle or inactive, and I have therefore provided for normally clutching the arm 59 to the shaft 50 by a device which permits said arm to be uncoupled from the shaft 50 and oscillated independently of the shaft. As herein shown the arm 59 is provided with the hub 67 through which the shaft 50 passes, said hub having one or more notches 68 in one end thereof in which fit projections 69 formed on a collar 70 which is splined to the shaft 50. The collar is normally held in operative engagement with the hub 67 by means of a spring 71 which has extending therefrom a projection 72 adapted to engage one side of the collar. If the spring 71 is withdrawn the collar 70 may be slid on the shaft 50 to disengage the projection 69 thereon from the notch 68, and when this is accomplished the hub 67 and its arm 59 can be oscillated on the shaft 50 while the latter is stationary, said hub 67 having a handle 73 thereon by which it may be manually operated.

*Stamp-affixing mechanism.*—As stated above, the stamp-affixing mechanism is carried by the vibrating arm or beam 10 which is pivoted at 12 to a fixed support 11. This beam is given its vibrating movement by means of the plunger 65 above referred to, said plunger having for this purpose a projection 74 pivotally connected to the beam 10. The plunger is provided at its upper end with a head 75, and a suitable coiled spring 76 is placed around the plunger between the head 75 and the shoulder or the fixed abutment 77 within the casing. The plunger extends down below the casing, and at its lower end is connected to an eccentric strap 78 which surrounds an eccentric 79 on a drive shaft 800. This shaft 800 is shown as having a gear 810 thereon which meshes with a pinion 820 which is driven by a crank disk 830, which crank disk may operate either by hand or by power as desired. In this way rotation of the crank disk 830 operates to give a vertical reciprocating movement to the plunger 65, and said plunger communicates movement to the beam 10 and also to the lever 61.

The stamps to be affixed are in the form of a ribbon which is wound on a reel or drum 80 that is supported in bearings in the beam 10, said beam being provided with the central opening 81 in which to receive the reel 80. The stamps are fed from the reel 80, as required, by means of two feed rollers 82 and 83. Both of these rollers are arranged to bear directly on the stamps that are wound on the reel, and as the stamps are fed from the reel 80 they pass over the surface of the feed roller 83 between said roller and a spring-pressed roller 84 and into a passageway 85 formed in the beam which leads into a vertically-extending chamber 86 within which operates a plunger 87, all as shown in Fig. 7 wherein the roller 83 is shown in section and the roller 82 in side elevation.

The feed rollers 82 and 83 are mounted in fixed bearings. The roller 84 is acted on at each end by suitable springs 88 which yieldingly hold it against the feed roller 83. The reel 80 is also acted on by suitable springs which operate to yieldingly hold it against the feed rollers 82 and 83. For this purpose the beam 10 is made with two slotted bearings 89 in which the ends of the shaft of the reel 80 are received, and each end of said shaft is acted on by a suitable spring 90 which tends to draw the reel toward the feed rollers 82 and 83.

While any suitable or convenient mechanism may be employed for operating the feed rollers, I have herein illustrated a pawl-and-ratchet mechanism which operates during each vertical movement of the beam 10 to feed the rollers 82, 83, forward sufficiently to advance the ribbon of stamps the length of one stamp.

The shaft of the roller 82 has rigid therewith a ratchet wheel 92 which is actuated by a pawl 93 pivoted at 930 to a block 94 that is adjustably mounted on an arm 95 which in turn is pivoted at 96 to the casing 66 or some other fixed support. The pawl has a slot 931 through which extends a pin 932 carried by the block 94, said pin serving to limit the swinging movement of the pawl about its pivot 930. The end of the arm 95 is pivotally connected to a link or arm 97 which in turn is pivoted to the end of the beam 10 at 98. Since the beam 10 swings about the pivotal point 12 while the arm 95 turns about the pivotal point 96, it will follow that when the beam 10 swings downwardly into the position shown in Fig. 7, the pawl 93 which is acted on by a suitable spring 99 will assume the position shown in said Fig. 7, while as the beam 10 is elevated, the nose 100 of said pawl will engage one of the ratchet teeth 92 and thereby advance the feed roll 82. The size of the ratchet wheel 92 and the construction of the pawl are such that the feeding movement given to the feed roller 82 is just sufficient to advance the surface thereof a distance equal to the length of one stamp.

The feeding roller 83 is preferably driven from the feeding roller 82, and for this purpose said roller 82 may have thereon a gear wheel 101 (see dotted lines Fig. 7) which meshes with a gear 102 on the shaft of the presser roll 84, and the gear 102 meshes with and drives the gear 103 fast on the shaft of the feed roller 83, said gears being shown in dotted lines in Fig. 7. The arrows in Fig. 7 give the direction in which the rollers 82 and 83 and the roll 80 rotate and the gearing between the rollers 82 and 83 is such that they rotate in unison. Since they both bear on the stamps which are wound on the reel it will follow that at each upward movement of the beam or arm 10 the surface of both feed rollers will be advanced the same distance, which in the present embodiment of the invention is just equal to the length of a stamp, so that at each upward movement of the beam 10 a stamp will be fed out of the passageway 85 into the chamber 86.

104 is a spring-pressed stop pawl which is adapted to engage a ratchet wheel 105 on the shaft of the roller 82, said pawl operating to prevent backward movement of the feed rollers.

As stated above, a plunger 87 operates in the chamber 86, said plunger being for the purpose of cutting each stamp from the ribbon of stamps and also affixing said stamp to the moistened envelop. The said plunger is arranged to be reciprocated and is elevated in the chamber 86 above the passageway 85 as the beam 10 rises and is depressed in said chamber 86 when the beam descends, said plunger during the downward movement operating to shear off the stamp which has been fed into the chamber and force said stamp against the moistened envelop. The forward feeding of the stamps occurs during the upward movement of the beam 10, and as stated above, the plunger is elevated in the chamber 86 during this upward movement of the beam so that the stamps may be freely fed into the chamber. For thus operating the plunger 87, I have shown the link 97 as having rigid therewith an arm 106, the end of which enters a slot 107 in the side of the chamber 86, and is provided with a slot 108 in which is received a pin 109 carried by the plunger. The plunger may conveniently be formed of a piece of sheet metal bent into substantially U-shape, as shown in Fig. 14 in which case the slotted end of the arm 106 is situated between the sides of the plunger. Since the beam 10 and the arm 95 swing about different centers and are connected by the arm 97, said arm will turn on its pivot 98 as the beam rises and falls, and since the arm 106 is rigid with the arm 97, the swinging movement of said arm 97 will result in a vertical movement of the plunger 87 in the chamber 86, as will be plainly seen in Figs. 1 and 7. The construction is such that when the beam 10 is elevated the plunger is also elevated above the passageway 85, and during the downward movement of the beam the plunger is forced downwardly in the chamber past the passageway 85 and below the bottom of said chamber 86. The edge 91 of the plunger 87 is purposely made so that it will shear off the stamp projecting into the chamber 86 as said edge passes the end of the passageway 85, and the movement of both the beam 10 and the plunger is sufficient to bring the face of the plunger against the envelop when the beam is in its lowest position. It will thus be apparent that during the downward movement of the beam 10 a stamp is sheared from the ribbon and applied to the moistened envelop with sufficient pressure to cause the stamp to adhere thereto. The lower face of the plunger is preferably perforated, as at 110, so as to prevent the formation of a cushion of air between the stamp and plunger which might cause the stamp to flutter away from the plunger before it was pressed against the envelop. The length of the slot 108 is such that when the plunger is in its lowest position the pin 109 is brought firmly against the end of the slot and, therefore, during the time that the shearing of the stamp is taking place the shearing edge 91 is held firmly against the wall of the chamber 86. I will preferably provide means whereby the pivot 98 can be adjusted slightly so as to always maintain this shearing engagement between the edge 91 and the side of the chamber 86 as wear occurs.

The portions of the pivot pin 98 which are supported in bearings in the ends of the beam 10 are made slightly eccentric so that by turning said pivot on its axis the arm 97 may be adjusted toward and from the plunger.

The block 94 is adjustably mounted on the arm 95 so that the feeding movement of the pawl 93 may be adjusted. Said block is held in its proper position by means of a clamping screw 111.

*Envelop ejecting mechanism.*—As stated above the stamped envelops are ejected from the magazine by means of ejector wheels 6. These wheels are preferably toothed wheels which are mounted on a shaft 113 that is suitably journaled in the frame 15, and means are provided for intermittently rotating said shaft thereby to give the ejector wheels their required movement. The teeth of the ejector wheels are sufficiently pointed so that as they are rotated they will have sufficient frictional engagement with the top envelop of the stack to eject said envelop, and the rotation of said wheels is in a direction to eject the stamped envelop from the magazine over the top of the end plate 31, and said end plate will therefore be properly adjusted so that the top edge thereof will stand just below the top envelop of the stack. For giving the shaft its intermittent movement I have provided the following mechanism;—Fast on said shaft is a ratchet wheel 114 (see Figs. 3 and 4) with which coöperates a pawl 115 carried by a pawl carrier 116 that is loosely mounted on the shaft 113. The pawl carrier has rigid therewith a pinion 117 which meshes with a rack 118, said rack being arranged to slide back and forth in suitable guides 119. The rack 118 is reciprocated, and each reciprocation will oscillate the pawl carrier 116, the oscillation of the pawl carrier in turn advancing the shaft 113 forward intermittently, as will be obvious. For giving the rack 118 its reciprocating movement I have provided a mechanism which operates in conjunction with the vibrating movement of the beam 10, and as herein shown said rack has connected thereto an arm 120 to which is pivotally connected one arm of an elbow lever 121, the latter being pivoted to the frame at 122. The other arm of said elbow lever has connected thereto a link 123 which in turn is pivotally connected to an arm 124 fast on a rock shaft 125 also supported in suitable bearings 126 rising from the frame 15. This rock-shaft 125 is arranged to be oscillated by the movement of the beam 10, and for this purpose said shaft has fast thereon a slotted arm 127 in the slot of which plays a pin 128 extending from the end 129 of the beam 10 so that as the beam 10 moves into the position shown in Fig. 7 the arm 127 is raised upwardly and the shaft is turned in a direction to move the rack 118 toward the right Fig. 3; while when the beam moves upwardly, the shaft will be turned in the opposite direction and the rack 118 moved to the left, Fig. 3. The movement of the rack to the left is that which gives the feeding movement to the shaft 113, and therefore said shaft is given its forward rotary movement while the beam 10 is moving upwardly. This particular mechanism for operating the envelop ejectors is not essential to the invention however.

In order to prevent more than one envelop from being ejected from the machine at each operation thereof, I have provided a device for gripping the stack of envelops as soon as the ejection of the top envelop begins. In the present embodiment of my invention this device is arranged adjacent the wall 35 of the hopper and is arranged so that as soon as the top or stamped envelop begins its movement out of the magazine said device is brought down against the end of the exposed envelop thereby clamping the remaining envelops of the stack firmly on the table.

Referring now to Fig. 11, 130 is a gripping device arranged directly over that end of the envelop 3 which has engagement with the wall 35. Said gripping device may have a roughened under surface or may be provided with teeth or prongs 131. As shown, it is carried by a resilient arm 132 which is secured to the frame 15 at one end, as at 133. Situated above the arm 132 is a cam member 134 which may be loosely mounted on the shaft 50. The cam member has connected thereto a link 136 which in turn is connected to one end of an elbow lever 137, pivoted to the frame 15 at 138. The other arm of said elbow lever is connected by a link 139 to an arm 140 fast on the rock shaft 125. Said cam member 134 is so arranged that when it is swung to the right, Fig. 11, it will bear downwardly on the stem 132 and thus force the gripping member 130 against the envelops, while when said cam member is swung to the left, Fig. 11, the pressure on the stem 132 is relieved and the resiliency of the stem lifts the gripping member slightly from the envelops. The connection between the rock shaft 125 and the cam member 134 is such that when said rock shaft is turned by the upward movement of the beam 10 the cam member 134 is moved to the right, Fig. 11, thereby causing the gripping member 130 to grip the envelop, but this occurs just after the top envelop has been carried backwardly out from underneath the gripping member so that when said gripping member grips the envelops it acts on the unstamped envelops of the stack. After the envelops in the magazine have all been stamped, it becomes necessary to lower the frame 13 and the table 4 in order to permit a fresh lot of envelops to be inserted in the magazine. To permit the table and frame to be thus lowered I have provided for disengaging the pinions 17 from the racks 16 thereby to permit the racks to be freely moved downward by the handle 170. While it is possible to arrange for disengaging the pinions from the racks in various ways without departing from my invention I have herein shown said pinions as mounted in eccentric bearings, so that by turning the bearings they are carried out of engagement with the racks. As shown in Figs. 5 and 6 the ends of the shaft 18 are journaled in hubs 140 carried by rearward extending arms 141. These hubs 140 are eccentric to the shaft 18 and have bearing in recesses formed in the standards 142 rising from the frame. When the hubs are turned in their bearings in the standards 142 the shaft 18 is carried rearwardly thereby to disengage the pinions from the rack as will be obvious. The two arms 141 are shown as connected by a bar 143, and one or both of said arms has a lug 144 projecting therefrom which is adapted to engage a stop 145 extending from the standard 142 when the arms are in their horizontal position, as shown in full lines Fig. 5. The arms carry at their end the U-shaped guard 146 which when the arms are in the horizontal position is situated closely adjacent to the envelops near the end plate 31, said guard serving to hold the envelops in proper position. When the arms 141 and guard 146 are thrown into the dotted line position, Fig. 5, the pinions 17 are disengaged from the racks so as to permit the racks to be adjusted downwardly.

*Operation.*—Although the operation of the machine will be apparent to those skilled in the art from the foregoing description, yet I will briefly describe the operation at this time.

Before the machine can be used for affixing stamps it will be necessary to fill the reel 80 with stamps in ribbon form. To accomplish this the reel may, if desired, be removed from the beam 10 and the stamps applied thereto with the face of the stamp inwardly and the gummed side outwardly. After the stamps have thus been applied to the reel and the reel has been replaced in the beam the ribbon of stamps is threaded through between the feed roll 83 and the pressure roll 84 into the passageway 85. To permit this to be done I have provided for removing the pressure on the pressure roll by pivoting to the beam 10 an elbow lever 150 one end of which has engagement with a pin 151 which is connected to a bearing block 152 that bears on the pressure roll 84 and which in turn is acted on by the spring 88. When the machine has been properly loaded with stamps and a package of envelops have been placed in the machine the driving shaft 800 is rotated by the means provided. As said shaft rotates the eccentric thereon causes the plunger 65 to move up and down, and since said plunger is connected to the beam 10 the movement of the plunger will cause the beam to swing about its pivot 12. As the beam swings downwardly the plunger shears off the end stamp from the ribbon of stamps and applies said stamp to the envelop. Upon the upward movement of the beam 10 the feeding rollers 82, 83, are operated to feed the ribbon of stamps forward to bring the next stamp into position to be sheared from the ribbon and at the same time the wheels 6 are rotated by the reciprocation of the rack 118 thereby to eject the stamped envelop from the magazine and the lever 61 is rocked thereby to cause the moistener to vibrate forwardly into contact with the top envelop on the stack and moisten the corner thereof where the stamp is to be affixed. During the next downward movement of the beam 10 a stamp is affixed to the moistened envelop and the operations above described are again repeated.

I have not attempted to illustrate herein all embodiments of my invention for the selected embodiment herein shown is sufficient to illustrate the principle of the invention. It will be obvious therefore that many changes in the constructional details of the various parts may be made without altering in any way the invention.

While in the above detailed description of the invention I have referred to it as affixing stamps to envelops it will be obvious that the invention is not limited to such use but may be used for the purpose of affixing to papers or packages gummed strips or labels of various kinds.

Having described my invention what I claim as new and desire to secure by Letters Patent is:—

1. In a stamp-affixing machine, the combination with means to sustain a pile or stack of envelops, of means to moisten the top envelop while on the pile, means to apply a stamp to the moistened envelop and envelop-ejecting mechanism.

2. In a stamp-affixing machine, the combination with means to sustain a pile or stack of envelops, of an envelop moistener, means to operate the latter to moisten the top envelop of the stack, means to cut a stamp from a plurality of connected stamps and apply said stamp to the moistened envelop and means to eject the stamped envelop from the pile.

3. In a stamp-affixing machine, the combination with means to sustain a pile or stack of envelops, of an envelop moistener, means to operate the latter to moisten the top envelop of the stack, means to cut a stamp from a plurality of connected stamps and apply said stamp to the moistened envelop while on the pile or stack, and means to eject the stamped envelop from the top of the pile.

4. In a stamp-affixing machine, the combination with a frame provided with means to sustain a plurality of envelops, of an arm pivotally mounted on said frame, a stamp-receiving reel carried by said arm, means to feed stamps therefrom, means to operate the arm, a device carried by the arm for applying said stamps to an envelop, and envelop-ejecting mechanism.

5. In a stamp-affixing machine, the combination with a frame provided with means to sustain a plurality of envelops, of an arm pivotally mounted on the frame, a stamp-receiving reel carried by said arm, means to feed stamps therefrom, an envelop moistener, and means to operate said arm to apply said stamps to an envelop.

6. In a stamp-affixing machine, the combination with a frame provided with means to support a plurality of envelops, of an arm pivotally mounted on the frame, a reel thereon for receiving stamps in ribbon form, means to operate said arm, means operated by the arm to shear a stamp from the ribbon of stamps and apply said stamp to an envelop and means to eject the stamped envelop.

7. In a stamp-affixing machine, the combination with a frame provided with means to support a plurality of envelops, of an arm pivotally mounted on the frame, a reel thereon for receiving stamps in ribbon form, means to operate the arm, an envelop moistener, and means operated by the arm to shear a stamp from the ribbon of stamps and apply said stamp to an envelop.

8. In a stamp-affixing machine, the combination with a pivoted arm and means to vibrate said arm, of a reel carried by the arm and adapted to sustain a plurality of connected stamps, a plunger operating in a chamber formed in the arm, means to feed a stamp into the chamber beneath the plunger, and means to operate said plunger thereby to affix a stamp to an envelop.

9. In a stamp-affixing machine, the combination with a vibrating arm and means to vibrate it, of a reel carried by said arm and adapted to receive stamps in ribbon form, a plunger operating in a chamber formed in said arm, said plunger having a shearing edge, means to feed a stamp into said chamber beneath the plunger, and means to operate said plunger thereby to shear said stamp from the other stamps and affix said stamp to an envelop.

10. In a stamp-affixing machine, the combination with a pivoted arm and means to vibrate said arm, of a reel carried by the arm and adapted to sustain a plurality of connected stamps, a plunger operating in a chamber formed in the arm, means to feed a stamp into the chamber beneath the plunger, and means actuated by the movement of the arm to operate said plunger thereby to affix said stamp to an envelop.

11. In a stamp-affixing machine, the combination with a vibrating arm and means to vibrate it, of a reel carried by said arm and adapted to receive stamps in ribbon form, a plunger operating in a chamber formed in said arm, said plunger having a shearing edge, means to feed a stamp into said chamber beneath the plunger, and means actuated by the movement of the arm to operate said plunger thereby to shear said stamp from the other stamps and affix said stamp to an envelop.

12. In a stamp-affixing machine, the combination with means to sustain a plurality of envelops placed one on the other, of a moistener, means to move the moistener to moisten the top envelop of the pile, a reel to receive stamps in ribbon form, a plunger operating in a chamber, means to feed a stamp into said chamber beneath the plunger, means operated by the plunger to affix said stamp to the moistened envelop and an envelop ejector.

13. In a machine for affixing stamps, the combination with means to sustain a plurality of envelops placed one on the other, of a moistener, means to move the moistener to moisten the top envelop of the pile, a reel to receive stamps connected together in ribbon form, a plunger having a shearing edge operating in a chamber, means to feed a stamp into the chamber beneath the plunger, and means to operate said plunger thereby to shear a stamp from the ribbon and affix said stamp to the moistened envelop and an envelop ejector.

14. In a stamp-affixing machine, the combination with means to sustain a plurality of envelops, of a moistener, a vibrating arm, means to vibrate it, a reel carried by said arm for holding stamps in ribbon form, a plunger operating in a chamber in said arm, means to feed a stamp into the chamber beneath the plunger, and means to operate the plunger during the downward movement of the arm thereby to affix a stamp to an envelop.

15. In a stamp-affixing machine, the combination with means to sustain a plurality of envelops, of a moistener, a vibrating arm, means to vibrate said arm, a reel sustained by the arm and adapted to contain stamps in ribbon form, a plunger operating in a chamber in said arm and having a shearing edge, means to feed a stamp into said chamber beneath the plunger, and means to operate the plunger during the downward movement of the arm thereby to shear a stamp from the ribbon of stamps and affix said severed stamp to an envelop.

16. In a stamp-affixing machine, the combination with a frame provided with means to sustain a plurality of envelops, of an arm pivotally mounted on the frame, a stamp-receiving reel carried by said arm, means to vibrate said arm, means to feed stamps from the reel during the upward movement of the arm, means to apply a stamp to an envelop during the downward movement of the arm and an envelop ejector.

17. In a stamp-affixing machine, the combination with a frame provided with means to sustain an envelop, of an arm pivotally mounted on the frame, means to vibrate said arm, a stamp-receiving reel carried by said arm, means to feed a stamp from the reel during the upward movement of the arm, means to shear said stamp from the other stamps on the reel and apply said stamp to an envelop during the downward movement of the arm and an envelop ejector.

18. In a stamp-affixing machine, the combination with a frame provided with means to sustain a plurality of envelops placed one on the other, of means to moisten the top envelop, an arm pivotally mounted on the frame, means to vibrate said arm, a stamp-receiving reel carried by the arm, means to feed a stamp from said reel during the upward movement of the arm, and means to apply said stamp to an envelop during the downward movement of the arm.

19. In a stamp-affixing machine, the combination with a frame provided with means to sustain a plurality of envelops placed one on the other, of means to moisten the top envelop, an arm pivotally mounted on the frame, means to vibrate said arm, a stamp-receiving reel carried by the arm, means to feed a stamp from said reel during the upward movement of the arm, and means to shear said stamp from the other stamps on the reel and apply said stamp to an envelop during the downward movement of the arm.

20. In a stamp-affixing machine, the combination with means to sustain an envelop, of means to moisten said envelop, a vibrating arm, a stamp-receiving reel carried thereby, stamp-feeding wheels also carried thereby, a ratchet for operating said wheels, a lever pivoted at one end to a fixed support and having pivotal connection with said arm, and a pawl carried by said lever for operating the ratchet wheel.

21. In a stamp-affixing machine, the combination with means to sustain an envelop, of a vibrating arm, a stamp-receiving reel carried thereby, stamp-feeding wheels also carried thereby, a ratchet for operating said wheels, a lever pivoted at one end to a fixed support and having pivotal connection with said arm, and a pawl carried by said lever for operating the ratchet wheel.

22. In a stamp-affixing machine, a rock-shaft having an arm thereon, an envelop moistener pivotally connected to said arm, and a spring to press said moistener against the envelops in combination with stamp-affixing mechanism and means to vibrate said rock-shaft.

23. In a stamp-affixing machine, a rock shaft, an arm thereon, a moistener, a jointed carrier for the moistener pivotally connected to said arm, a spring acting on said jointed carrier for applying pressure to the moistener, and means to vibrate the rock shaft.

24. In a stamp-affixing machine, the combination with a yieldingly-supported envelop-receiving table adapted to sustain a pile of envelops, stamp-affixing mechanism to affix a stamp to the top envelop of the pile, and means to eject the stamped envelop, and means to elevate said table gradually as the envelops are ejected therefrom.

25. In a stamp-affixing machine, the combination with an envelop-sustaining frame, of an envelop-receiving table yieldingly supported thereby and adapted to sustain a plurality of envelops placed one on the other, means to affix a stamp to the top envelop, means to eject the stamped envelop from the table, and means to elevate the frame gradually as the envelops are ejected.

26. In a stamp-affixing machine, the combination with a yieldingly-supported envelop-receiving table adapted to sustain a pile of envelops, stamp-affixing mechanism to affix a stamp to the top envelop of the pile, means to eject the stamped envelop from the pile of envelops, and means operated by the stamp-affixing mechanism to elevate the table gradually as the envelops are ejected therefrom.

27. In a stamp-affixing mechanism, the combination with a envelop-sustaining frame, of an envelop-receiving table yieldingly sustained thereby and adapted to sustain a pile of envelops placed one on the other, stamp-affixing mechanism to affix a stamp to the top envelop of the pile, means to eject the stamped envelop from the pile, and means operated by the stamp-affixing mechanism to elevate the table gradually as the stamped envelops are ejected therefrom.

28. In a stamp-affixing machine, the combination with an envelop-receiving magazine having two adjacent sides fixed and non-adjustable and the other two sides adjustable, one of said adjustable sides being pivotally sustained, of stamp-affixing mechanism.

29. In a stamp-affixing machine, an envelop-receiving magazine having one side and one end fixed and non-adjustable, means to yieldingly sustain the other side for yielding movement toward and from the fixed side, means to sustain the other end for movement toward and from the fixed end, a clamp for holding the movable end in its fixed position, in combination with stamp-affixing mechanism.

30. In a stamp-affixing machine, an envelop-receiving magazine comprising a table, a fixed side and a fixed end plate, a spring-pressed side opposed to the fixed side, an adjustable end plate opposed to the fixed end plate, an adjustable slide to which said end plate is pivotally connected, and means to clamp the slide in its adjusted position, in combination with a stamp-affixing mechanism.

31. In a stamp-affixing machine, the combination with an envelop-receiving table, of a vibrating arm, stamp-affixing means thereon, and means operated by the arm to eject stamped envelops.

32. In a stamp-affixing machine, the combination with a frame provided with means to sustain envelops, of a vibrating arm pivoted to the frame, stamp-affixing mechanism thereon, envelop-ejecting wheels, and means to intermittently rotate said wheels.

33. In a stamp-affixing machine, the combination with a frame provided with means to sustain envelops, of a vibrating arm pivoted to the frame, stamp-affixing mechanism thereon, envelop-ejecting wheels, and means operated by the arm to intermittently rotate said wheels.

34. In a stamp-affixing machine, the combination with means to sustain envelops, of a stamp affixer, an envelop ejector, and means to grip the envelops which are not to be ejected.

35. In a stamp-affixing machine, the combination with an envelop-sustaining table, of a stamp-affixing mechanism located above the table, means to eject the stamped envelop from the table, and means to hold the unstamped envelops thereon.

36. In a stamp-affixing machine, the combination with a table to sustain envelops, of stamp-affixing mechanism, an ejector to eject the stamped envelops from the table, and an envelop gripping member to grip the unstamped envelops and hold them on the table while the stamped envelops are being ejected.

37. In a stamp-affixing machine, the combination with means to sustain a pile of envelops sustained one on the other, of means to cut a stamp from a plurality of connected stamps and apply said stamp to the top envelop on the stack, and means to eject said stamped envelop.

38. A stamp-affixing machine comprising instrumentalities for feeding and affixing stamps, a holder for sustaining a pack of articles in position to receive stamps, and a feeder for removing the outermost article of the pack after it has received a stamp.

39. A stamp-affixing machine comprising instrumentalities for feeding and affixing stamps, a holder for sustaining a pack of articles in position to receive stamps, and a feeder for removing the articles one at a time, between successive actuations of said instrumentalities.

40. A stamp-affixing machine comprising a holder for sustaining a pack of articles to be stamped, instrumentalities for feeding and applying stamps to such articles, a feeder for removing the outermost member of the pack after a stamp has been affixed thereto, and an arrester for engaging the second member of the pack and preventing movement thereof by said feeder.

41. A stamp-affixing machine comprising a holder for sustaining a pack of articles to be stamped, instrumentalities for feeding and applying stamps to such articles, a feeder for removing the outermost member of the pack after a stamp has been affixed thereto, and an arrester extending over the pack, and means for pressing it into engagement with the second member of the pack as soon as the outer member is clear.

42. A stamp-affixing machine comprising a reel for holding a strip of connected stamps, a plurality of rolls forming a cradle against which the reel is adapted to rest, a feed roll coöperating with one of the cradle rolls to grip the strip, means for rotating said rolls to unwind and draw off the strip from the reel, and means for severing stamps from the strip.

43. A stamp-affixing machine comprising a reel for holding a strip of connected stamps, a plurality of rolls forming a cradle against which the reel is adapted to rest, means for rotating said rolls and thereby frictionally turning the reel in a strip-unwinding direction, and means for severing stamps from the strip.

44. A stamp-affixing machine comprising a reel for holding a strip of connected stamps, a plurality of rolls forming a cradle against which the reel is adapted to rest, a feed roll coöperating with one of the cradle rolls to grip the strip, means for rotating the rolls, connections between the rolls whereby the rolls in contact with the reel are caused to turn in one, and the feed roll in the other direction to unwind and draw off the strip from the reel, and means for severing stamps from the strip.

45. A stamp-affixing machine comprising a movable presser having passages to permit escape of air displaced by its movement, a guideway therefor having a slot, and means for feeding a strip of stamps through said slot into the guideway, said presser being arranged in moving along the guideway to shear off stamps from the strip between one of its edges and an edge of the slot and carry the severed stamps to letters, etc., held in the path thereof.

46. A stamp-affixing machine comprising a holder for a number of articles to be stamped, means for moistening the articles in said holder, means for supporting a strip of stamps, means for feeding the strip, a presser, means for separating one stamp at a time, said presser being movable relatively to said supporting and feeding means, and pawl and ratchet devices connected with the presser and feeding means for operating the latter during such relative movement and locking it at the completion of the movement.

47. A stamp-affixing machine comprising a support, an arm pivoted adjacent said support, stamp-holding and feeding means on said arm, a stamp presser movably mounted in said arm, an actuator for swinging the arm, and connections engaged with said presser and the support for moving the presser relatively to the arm when the latter is moved.

48. A stamp-affixing machine comprising a support, an arm pivoted adjacent said support, stamp-holding and feeding means on said arm, a stamp presser movably mounted in said arm, an actuator for swinging the arm, a lever pivoted to the arm and engaged with the presser, and a link pivoted to the lever and to the support at a fixed point, whereby movement of the arm causes the presser to move relatively thereto and carry a stamp into position for application.

49. A stamp-affixing machine comprising a supporting column, an arm pivoted adjacent said column, stamp-holding and feeding means on said arm, a stamp presser movably mounted in said arm, an actuator for swinging the arm, a bell-crank lever pivoted to the arm and engaged with the presser, a link pivoted to the lever and to the column at a fixed point, and a plunger movable in the column and connected to the arm to operate the latter, whereby movement of the arm causes the presser to move relatively thereto and carry a stamp into position for application.

50. A stamp-affixing machine comprising a support having means for retaining a pack of letters to be stamped, a pivoted arm, stamp-holding, stamp-feeding and stamp-applying means carried by said arm, an actuator for moving the arm toward and from the letter pack to affix stamps, a letter feeder engaging the outermost letter of the pack, and connections for operating said letter feeder, as the arm moves away from the pack, to remove the outermost letter.

In testimony whereof, I have signed my name to this specification, in the presence of two subscribing witnesses.

JOHN F. MONAGHAN.

Witnesses:
FRANCIS L. ALWARD,
A. B. TURNER.